United States Patent [19]
Rosebrock

[11] Patent Number: 4,736,248
[45] Date of Patent: Apr. 5, 1988

[54] METHOD AND DEVICE FOR GENERATING INTERMEDIATE PICTURE SIGNALS FROM REFERENCE PICTURE SIGNALS HAVING A REDUCED PICTURE FREQUENCY

[75] Inventor: Jens K. J. Rosebrock, Bremen, Fed. Rep. of Germany

[73] Assignee: U.S. Philips Corporation, New York, N.Y.

[21] Appl. No.: 904,742

[22] Filed: Sep. 5, 1986

[30] Foreign Application Priority Data

Sep. 5, 1985 [DE] Fed. Rep. of Germany ....... 3531677

[51] Int. Cl.$^4$ ............................................... H04N 7/12
[52] U.S. Cl. ...................... 358/140; 358/105; 358/136
[58] Field of Search ................... 358/105, 136, 140

[56] References Cited

U.S. PATENT DOCUMENTS 4,575,756 3/1986 Furukawa .......................... 358/136
4,636,862 1/1987 Hatori ................................ 358/105

OTHER PUBLICATIONS

*IEEE Trans. on Acoustic, Speech and Signal Processing,* vol. ASSP-29, No. 6, Dec. 1981, pp. 1147–1152, "Estimating Three-Dimensional Motion Parameters of a Rigid Planar Patch", R. Y. Tsai and T. S. Huang.

*Primary Examiner*—Howard W. Britton
*Attorney, Agent, or Firm*—Thomas A. Briody; William J. Streeter; Anne E. Barschall

[57] ABSTRACT

A known method of generating intermediate pictures is based on an assumed linear interpolation of the positional change of corresponding objects in successive reference pictures. Such intermediate pictures, however, do not correspond to real pictures, notably when the reference pictures originate from a sensor moves along a curved path. In accordance with the invention the assignment of corresponding object points in successive reference pictures is subdivided so that the resultant assignment, starting from one reference picture, can be repeatedly performed on the successive intermediate pictures so that ultimately the next reference picture is obtained. Such an assignment algorithm produces faithful intermediate pictures also when the sensor is moved along a curved path.

28 Claims, 3 Drawing Sheets

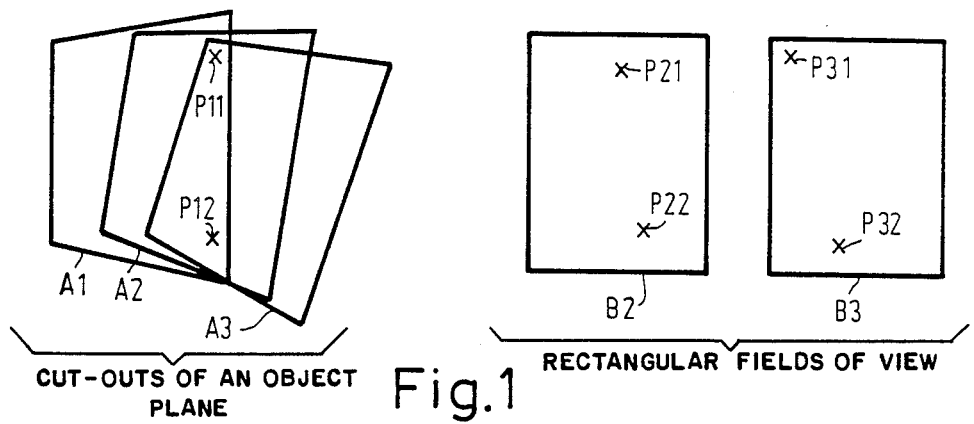
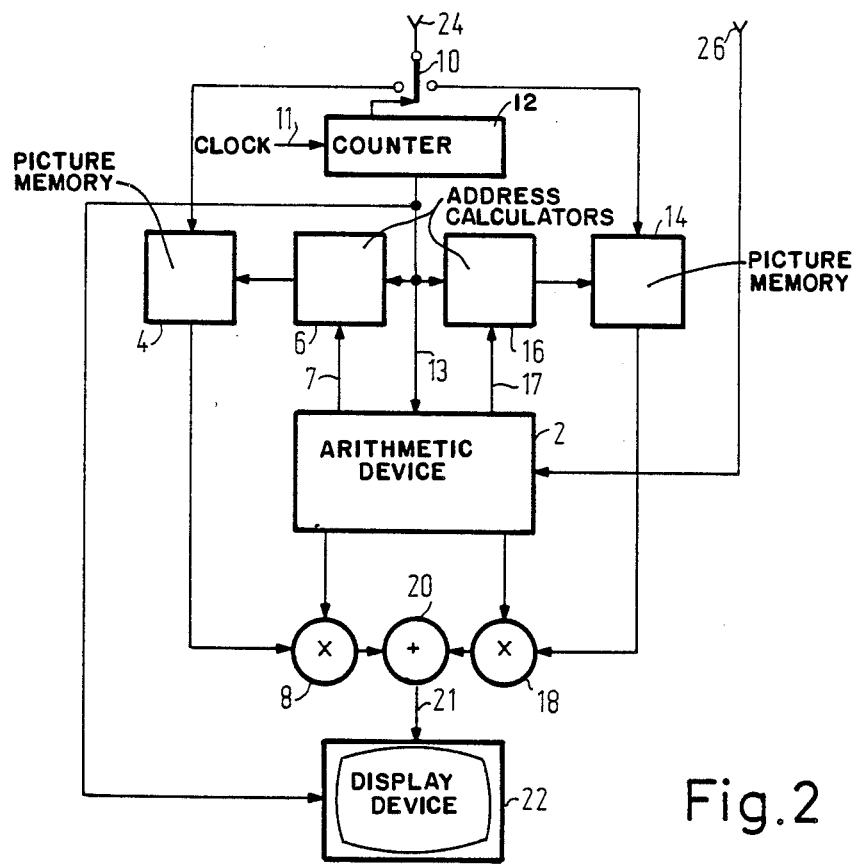

METHOD AND DEVICE FOR GENERATING INTERMEDIATE PICTURE SIGNALS FROM REFERENCE PICTURE SIGNALS HAVING A REDUCED PICTURE FREQUENCY

FIELD OF THE INVENTION

The invention relates to a method for receiving reference picture signals at a standard picture frequency from sensor means that are being displaced relative to an object plane, and to generate from said reference picture signals intermediate picture signals for intermediate pictures that together with the reference pictures have a secondary picture frequency that is increased by a factor of N with respect to said standard picture frequency, by means of interpolating and/or extrapolating each intermediate picture pixel signal with respect to at least one pixel signal of the pixel signals of a first reference pixel of a preceding reference picture and of a second reference pixel of a subsequent reference picture, wherein the coordinates of any reference pixel are determined from the coordinates of the relevant pixel in the intermediate picture by means of an assignment algorithm determined by said sensor means being displaced. The invention also relates to a device for performing the method.

DESCRIPTION OF THE PRIOR ART

A method of this kind is known from German Patent DE-PS No. 30 18 329. Therein, the coordinates of the reference pixels of the reference pictures are determined by linear geometrical assignment, i.e. for the reconstruction of the intermediate pictures it is assumed that the partial image of each object in the object plane, as represented by a particular pixel, moves along a straight path from one reference picture to the corresponding pixel of the next reference picture. Thus also any interpolated and/or extrapolated pixel would lie on this path. The assignment algorithm is based on the determination of the motion of two overall reference pixels that have different X and Y coordinates in each reference picture. These two overall reference pixels determine a coordinate system and X- and Y-magnification scales in each of the reference pictures. The motion of an overall reference pixel may be determined by correlation of the content of the reference pictures, which is a technique that is known in the art. The sensor may be any appropriate image forming device, such as a two-dimensional solidstate sensor array, provided with an appropriate optical system such as a lens and/or optical aperture. Thus, such sensor has an optical axis. It should be noted that the invention does not relate to the interpolation of intermediate picture pixels solely based on the signals of reference pixels on exactly the same position in the reference pictures.

The known method generally yields a rough approximation only of the real motion of the partial images. This applies when the optical axis is not perpendicular to the object plane. This applies even more when the sensor follows a curved path instead of a straight path between successive reference pictures. In the case of a curved path, the known method produces intermediate pictures which deviate substantially from the intermediate pictures that would result from the sensor directly.

SELECTED SUMMARY OF THE INVENTION

It is an object of the invention to provide a method which enables a more faithful reconstruction of the non-transmitted intermediate pictures, even when the sensor has followed a curved path.

This object is achieved in accordance with the invention in that in case said sensor means have an optical axis that has at least a directional component parallel to said object plane the assignment algorithm is formed from the assignment of corresponding reference pixels in both reference pictures in such a manner that N successive, multiplicative, executions of the assignment algorithm formed, each time starting from one reference picture, result in the assignment of the pixels of this reference picture to those of the other reference picture, the signals of the pixels of the $n^{th}$ intermediate picture, taken each time from one reference picture, being determined from reference picture pixels whose coordinates in each time the other reference picture are determined by N-n successive multiplicative executions of the corresponding assignment algorithm.

Thus, in accordance with the invention the assignment between the pixels of two reference pictures is sub-divided so that there is formed a plurality of the same assignments which can be linked in a multiplicative way so as to form the assignment for the two reference pictures. The assignment algorithm obtained for the intermediate pictures by means of such a sub-division produces intermediate pictures which do not contain geometrical distortions, i.e. intermediate pictures which resemble the real pictures of the object plane. At least in the case of an arbitrary translatory displacement of the sensor (without rotation), but possibly also in the case of nonuniform displacement of the sensor parallel to the object plane, this assignment algorithm will produce intermediate pictures as would have been recorded by a displaced sensor under uniform motion.

Also in the case of displacement of the sensor along a curved path parallel to the object plane and with a constant orientation relative to the curve tangent, intermediate pictures will be obtained which are actually recorded by the sensor during uniform displacement or which correspond to those of a regularly displaced sensor in the case of irregular displacement. In practice, the number of overall reference pixels must now be chosen higher. A value of three would give a better solution, the three defining each time a coordinate system and scale factors along each of the two coordinate directions, in the associated reference picture. In many cases, the motion of the image of a partial object now goes along a curved line. Often, the sensor will move in a more or less "forward" direction with respect to the object plane, i.e., objects will enter the field of view generally from the top, and often will leave it at the bottom. Then it will be apparent that in intermediate pictures which have the same size or which represent a picture cut-out having the same size as the reference pictures the lower edge region can be generated only from the preceding reference picture, that is to say only be extrapolation, because this edge region will no longer be present in the subsequent reference picture. Similarly, the upper edge region of the intermediate pictures can be generated only from the subsequent reference picture. Thus, each intermediate picture is generated by a mixture of interpolation and extrapolation, unless the intermediate pictures are smaller than the reference pictures. Notably in that case, when the assignment signals are already available but the subsequent reference picture has not yet been completely transmitted, the first intermediate pictures can also be generated from the preceding reference picture exclusively by extrapolation.

However, the two reference pictures need not be direct neighbours; for example, it may occur that an intended reference picture cannot be received in whole or in part because of disturbance. The values of N and n should then be adapted accordingly.

In practice the sub-division of the assignment in accordance with the invention depends on the form of the assignment for two successive reference pictures. From IEEE Trans. on Acoustic, Speech, and Signal Processing, Vol. ASSP-29, No. 6, December 1981, pages 1147–1152, it is known that in the case of a centrally perspective imaging sensor the following assignment holds good for corresponding pixels in two reference pictures:

$$\begin{pmatrix} X_{R2} \\ Y_{R2} \\ 1 \end{pmatrix} = \frac{1}{a_7 X_{R1} + a_8 Y_{R1} + 1} \begin{pmatrix} a_1 & a_2 & a_3 \\ a_4 & a_5 & a_6 \\ a_7 & a_8 & 1 \end{pmatrix} \begin{pmatrix} X_{R1} \\ Y_{R1} \\ 1 \end{pmatrix}$$

where $X_{R1}, Y_{R1}$ and $X_{R2}, Y_{R2}$ are the coordinates of the pixels of neighbouring reference pictures and the values $a_1$ to $a_8$ of the matrix are determined at least from the two reference pictures. This may be effected by having four overall reference pixels in each of the two reference pictures. The assignment algorithm for the intermediate pictures is then formed by:

$$\begin{pmatrix} X_{R2} \\ Y_{R2} \\ 1 \end{pmatrix} = \frac{1}{c_7 X_n + c_8 Y_n + c_9} \begin{pmatrix} c_1 & c_2 & c_3 \\ c_4 & c_5 & c_6 \\ c_7 & c_8 & c_9 \end{pmatrix} \begin{pmatrix} X_n \\ Y_n \\ 1 \end{pmatrix}$$

where $$\begin{pmatrix} c_1 & c_2 & c_3 \\ c_4 & c_5 & c_6 \\ c_7 & c_8 & c_9 \end{pmatrix} = \begin{pmatrix} b_1 & b_2 & b_3 \\ b_4 & b_5 & b_6 \\ b_7 & b_8 & b_9 \end{pmatrix}^{N-n}$$

where $X_n, Y_n$ are the coordinates of the pixels of the relevant intermediate picture and the values b1 to b9 for the assignment algorithm are formed by:

$$\begin{pmatrix} b_1 & b_2 & b_3 \\ b_4 & b_5 & b_6 \\ b_7 & b_8 & b_9 \end{pmatrix} = \begin{pmatrix} a_1 & a_2 & a_3 \\ a_4 & a_5 & a_6 \\ a_7 & a_8 & 1 \end{pmatrix}^{1/N}$$

Using the values thus obtained for the matrix of values c1 to c9, for each pixel of a given intermediate picture there can be determined the coordinates of the associated pixel of the two reference pictures; the signal of the relevant pixel of the intermediate picture is determined from the picture signals of these pixels. The matrix of the values c1 to c9 can be determined by forming the corresponding power of the matrix of the values b1 to b9, representing the assignment of the pixels of two successive intermediate pictures, or directly by forming the fractional power of the matrix of the values a1 to a8. Notably the latter power can be simply and sufficiently accurately approximated in that the values c1 to c9 are formed by:

$$\begin{pmatrix} c_1 & c_2 & c_3 \\ c_4 & c_5 & c_6 \\ c_7 & c_8 & c_9 \end{pmatrix} =$$

$$\frac{N-n}{N} \begin{pmatrix} \frac{N}{N-n} + (a_1 - 1) & a_2 & a_3 \\ a_4 & \frac{N}{N-n} + (a_5 - 1) & a_6 \\ a_7 & a_8 & \frac{N}{N-n} \end{pmatrix}$$

Thus, intermediate pictures will be obtained which resemble the exact intermediate pictures as well as possible.

When intermediate pictures are generated by interpolation between each time corresponding pixels of both references pictures, different assignment algorithms will be required for both reference pictures; these algorithms can be derived from the two reference pictures in that, each time starting from one reference picture, the pixels are assigned to the other reference picture and in that from these two assignments there can be formed the two assignment algorithms for determining the coordinates of the pixels of both reference pictures, starting from a given pixel of the intermediate picture to be generated. In many cases, however, it may be simpler to use the inverse of the assignment algorithm as the assignment algorithm for determining the coordinates of the one reference picture, used for determining the coordinates of the other reference picture. For the described known assignment for two pictures this implies a matrix inversion which can be performed more simply than the determination of the assignment of pixels of two neighboring reference pictures.

The assignment of corresponding pixels in two reference pictures can be determined from the transmitted reference pictures at the location of reception. However, the signals representing the assignment of corresponding pixels in two reference pictures can alternatively be determined at the side of the sensor and transmitted in addition to the reference picture signals. It is particularly attractive when the signals indicating the assignment are determined at the side of the sensor from the pictures which are generated at a higher picture frequency by the sensor. This not only prevents the use of an incorrect assignment, caused by transmission errors in the reference picture, for determining the assignment algorithm, but also simplifies the determination of the assignment which also becomes more reliable.

Recordings may often involve several object planes which possibly move differently relative to the sensor. In that case for each object plane there is preferably formed a separate assignment algorithm from the assignment of corresponding pixels in a partial picture region containing the relevant object plane. The reconstructed intermediate pictures are thus composed of two or possibly more picture regions.

A device for simply performing the method in accordance with the invention preferably includes an arithmetic device which determines, from the signals representing the assignment of corresponding pixels in two reference pictures, the signals for the resultant assignment of the pixels of the reference picture stored in the associated picture memory to each pixel of the relevant intermediate picture, at least one random addressable picture memory which stores the transmitted reference picture signals in a given address sequence, an address calculating device which generates, from the signals determined for the assignment algorithm by the arithmetic device and from the coordinates of the pixels of the relevant intermediate picture to be generated, the addresses of the associated reference picture signals in the picture memory and which applies these addresses thereto, and an output device which generates the intermediate picture signals read at these addresses. The arithmetic device may be constructed especially for the determination of the signals for the assignment algorithm, the resultant assignment being determined for each new intermediate picture by the (N-n)-fold use of the assignment algorithm for successive intermediate pictures, or by direct formation of the assignment as has already been explained for the known formation of the assignment for two pictures. The picture memory then contains the picture signals of the preceding reference picture and the address calculating device supplies, for each pixel of the intermediate picture to be generated, the addresses of pixels in the picture memory where the corresponding picture signals are read. In this extrapolation case the output device generates the intermediate picture signals directly from the reference picture signals.

For generating intermediate picture signals by interpolation, there are preferably provided two random addressable picture memories which alternately store the reference picture signals of one reference picture, with each picture memory there being associated an address calulating device, the arithmetic device determining for each address calculating device the signals for the resultant assignment of the pixels of the reference picture stored in the associated picture memory to each pixel of the relevant intermediate picture, the output device including for each picture memory a multiplier which multiplies the reference picture signals read from the associated picture memory by a weighting factor which is generated by the arithmetic device in accordance with the rank number n of the intermediate picture, and an adder for adding the multiplied reference picture signals and for generating the intermediate picture signals. As a result of the alternating storage of successive reference pictures by the two picture memories, both reference pictures will be available in parallel for generating the intermediate pictures. However, because the transmission of the reference picture signals is usually so slow that the transmission period for a reference picture is greater than the period of time required for the display of a picture, it will also be necessary to include a buffer memory for the signals of the reference picture just transmitted, because the contents of the two random addressable picture memories must remain the same for the full period of time required for generating all intermediate pictures between two successive reference pictures. The intermediate picture signals are generated by a combination of the picture signals of the reference pictures which combination depends on the distance in time between the relevant intermediate picture and the associated reference picture.

When for a given pixel of an intermediate picture, the coordinates of the associated pixel in a reference picture are determined, the calculation will only rarely produce integer coordinates; fractional coordinate values are also produced; which means that the pixel in the reference picture associated with a given pixel of the intermediate picture is situated between pixels actually present in the reference picture. In the simplest case the coordinate value can be rounded off, which means that use is made of the actual pixel of the effective reference picture which is situated nearest to the "ideal reference" pixel. For more accurate determination of the pixels of an intermediate picture, the picture signal of the mathematically determined pixel can also be determined from the signals of the four surrounding pixels. To this end, each picture memory preferably consists of four sub-memories. Each submemory stores the reference picture signals of a respective one of each time four neighbouring reference pixels in a square. Each address calculating device determines the addresses with an accuracy of fractions of integer units and addresses in each sub-memory the reference pixel which best approximates the exact address. The picture signal outputs of the sub-memories are followed by a multiplier device which multiplies the picture signal of each sub-memory by a weighting factor. The weighting factor is derived from the last position before the decimal point and the positions behind the decimal point of the exact address. The picture signal outputs of the sub-memories are also followed by an adder device for adding the multiplied picture signals and for generating the resultant reference picture signal for the output device. Each picture signal on the reference picture is thus determined from the picture signals of four neighbouring reference pixels in a square, each of which has been weighted separately as a function of the distance from the mathematically determined pixel. The use of four sub-memories per picture memory thus enables very fast processing.

A very fast method of determining the coordinates of the reference pixels when use is made of assignment algorithms derived from the described known method of determining the assignment of reference pictures is characterized in that each address calculating device includes three sub-calculators. The three sub-calculators separately determine the two enumerator values for the addresses of the two coordinate directions and the denominator value from the values $c_1$ to $c_9$ supplied by the arithmetic device and from the coordinates of the instantaneous pixel of the buffer memory. Each address calculating device also includes a reciprocal value forming device which follows the sub-calculator for the denominator value and which forms the reciprocal value of the denominator value, and two multipliers which multiply the two respective numerator values by the reciprocal value. The output signals of the two multipliers together represent the address of the reference picture pixel in the associated reference picture memory. Because a division having the same denominator in both cases is to be performed for each determination of the two coordinates of a reference picture pixel, the denominator need be determined and converted into the reciprocal value only once. This can be readily and quickly performed by means of a reciprocal value forming device which is preferably constructed as a read-only memory, thus enabling the use of multipliers which operate faster than dividers.

A particularly attractive embodiment of the device in accordance with the invention for the case involving the described known method of assignment of two reference pictures is characterized in that each sub-calculator includes an accumulator which is formed by an adder followed by a register whose output is connected to one input of the adder. The other input of the adder is preceded by a switch which, under the control of a picture changing signal at the beginning of each new intermediate picture, reduces the absolute coefficient c3 or c6 or c9 or a value derived therefrom and, moreover, under the control of a row changing signal at the beginning of each new row, the coefficient c2 or c5 or c8 associated with the row coordinate $Y_n$ by k times the coefficient c1 or c4 or c7 associated with the column coordinate $X_n$ (pixels), where k is the number of pixels per row. The switch otherwise applies the latter coefficient to the other input of the adder. The register takes up the output signal of the adder in reaction to each pixel clockpulse its output supplying the relevant subcalculator with the numerator value or the denominator value, respectively. The coefficients b1 to b9 are chosen or standardized so that the row coordinate and the column coordinate can be represented by the corresponding rank number, so that the multiplication of a coordinate value by a coefficient can be replaced by the accumulation of this coefficient; this results in a particularly simple device.

BRIEF DESCRIPTION OF THE FIGURES

Embodiments in accordance with the invention will be described in detail hereinafter with reference to the drawing. Therein:

FIG. 1 shows the position of fixed object points in successive reference pictures, FIG. 2 shows a block diagram of a device for performing the method in accordance with the invention.

DESCRIPTION OF THE ASSIGNMENT PRINCIPLES

Figures 3, 4:
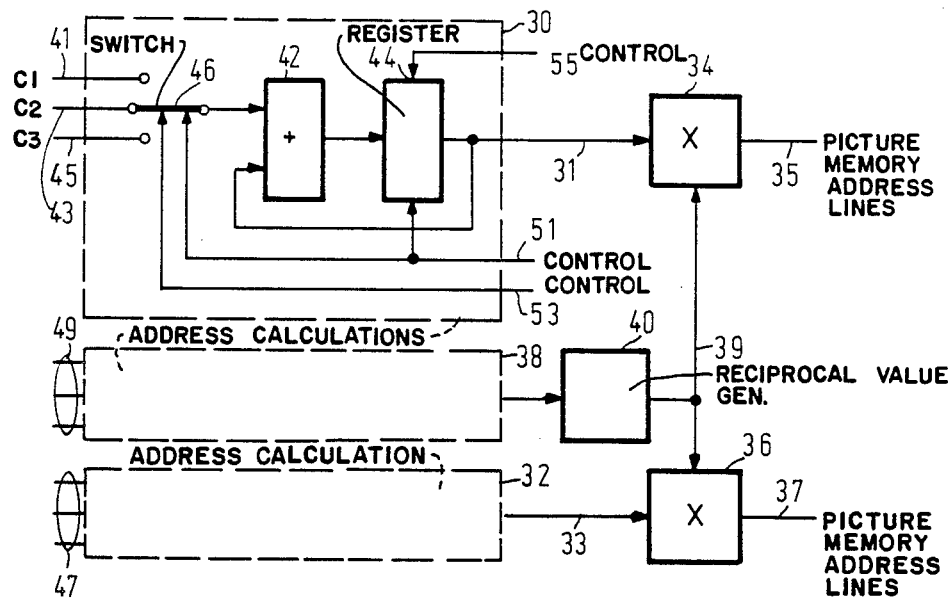
FIG. 3 shows a block diagram of an address calculator for use in the device shown in FIG. 2.
FIG. 4 shows the distribution of the pixels of a reference picture between four sub-memories.

The reference A1, A2, and A3 in FIG. 1 denote three cut-outs of an object plane which are successively scanned by a moving sensor (not shown) in order to be converted into electric signals. The cut-outs A1 to A3 are distorted into a trapezoidal shape. This may occur when the sensor is, for example a camera with a rectangular field of view, which is connected to an aeroplane and looking into a forward-downward direction. It is assumed that the sensor proceeds along a curved path. Relative to these cut-outs, the point P11 at the top right (in the figure) in the cut-out A1 thus moves to the top left in the cut-out A3, while the point P12 at the bottom right in the cut-out A1 moves approximately to the centre at the bottom of the cut-out A3.

The rectangular reference pictures B2 and B3 associated with the cut-outs A2 and A3, respectively are shown separately. Each reference picture corresponds to the rectangular field of view named hereabove and would thus represent the representation of the associated cut-out on a display element such as a C.R.T. Other shapes, such as circular, could also be realized. Now, object point P11 is situated in positions P21 and P31, while object point P12 is situated in positions P22 and P32. The aim is the formation of intermediate pictures which represent cut-outs of the object plane which situated would be in time between the cut-outs A2 and A3, the picture signals of the intermediate pictures being derived from the picture signals of the reference pictures B2 and B3, that is to say by utilizing the assignment of, for example the points P21 and P22 and further points not shown to the points P31 and P32 and corresponding further points.

In accordance with the cited article in IEEE Trans. on Acoustics, Speech, and Signal Processing, Vol. ASSP-29, No. 6, December 1981, pages 1147-1152, the assignment of all corresponding pixels in two successive pictures can be represented by a set of eight parameters as follows, R1, R2 indicating two reference pictures:

$$\begin{pmatrix} X_{R2} \\ Y_{R2} \\ 1 \end{pmatrix} = \frac{1}{a_7 X_{R1} + a_8 Y_{R1} + 1} \begin{pmatrix} a_1 & a_2 & a_3 \\ a_4 & a_5 & a_6 \\ a_7 & a_8 & 1 \end{pmatrix} \begin{pmatrix} X_{R1} \\ Y_{R1} \\ 1 \end{pmatrix}$$

This means that for each coordinate $X_{R1}$, $Y_{R1}$ of the reference picture R1 there can be found, using the assignment parameters a1 to a8, the coordinates $X_{R2}$, $Y_{R2}$ of that point of the reference picture R2 which represents the same object element in the object plane.

An assignment algorithm for directly successive intermediate pictures which are situated between two reference pictures, for example between the two reference pictures B2 and B3 in FIG. 1, should be such that when the coordinates of an intermediate picture are used the coordinates of the corresponding pixels of the next intermediate picture are obtained. Thus, in accordance with the known assignment there can be found a set of assignment parameters b1 to b9 which satisfy these conditions. Because of the fact that the assignment between any two arbitrary directly successive intermediate pictures should always be the same, it can be demonstrated that the parameters for the associated assignment algorithm can be derived as follows from the assignment of the two reference pictures in question:

$$\begin{pmatrix} b_1 & b_2 & b_3 \\ b_4 & b_5 & b_6 \\ b_7 & b_8 & b_9 \end{pmatrix} = \begin{pmatrix} a_1 & a_2 & a_3 \\ a_4 & a_5 & a_6 \\ a_7 & a_8 & 1 \end{pmatrix}^{1/N}$$

Because the derivation of each intermediate picture from each time the preceding intermediate picture could lead to an accumulation of inadmissible inaccuracies it is more attractive to relate each intermediate picture directly to the preceding intermediate picture and to relate it also to the next reference picture during interpolation in the following manner:

$$\begin{pmatrix} X_{R2} \\ Y_{R2} \\ 1 \end{pmatrix} = \frac{1}{c_7 X_n + c_8 Y_n + c_9} \begin{pmatrix} c_1 & c_2 & c_3 \\ c_4 & c_5 & c_6 \\ c_7 & c_8 & c_9 \end{pmatrix} \begin{pmatrix} X_n \\ Y_n \\ 1 \end{pmatrix}$$

where $$\begin{pmatrix} c_1 & c_2 & c_3 \\ c_4 & c_5 & c_6 \\ c_7 & c_8 & c_9 \end{pmatrix} = \begin{pmatrix} b_1 & b_2 & b_3 \\ b_4 & b_5 & b_6 \\ b_7 & b_8 & b_9 \end{pmatrix}^{N-n}$$

Therein, $X_n$ and $Y_n$ represent the coordinates of a pixel of the $n^{th}$ intermediate picture, with respect to the preceding reference picture. Thus, the intermediate picture is directly related to a reference picture (in this case the next-following one) by an assignment utilizing a set of parameters produced by the N-n-fold multiplicative use of the assignment algorithm formed with the parameters b1 to b9.

The coordinate in the preceding reference picture would result from the coordinates of the intermediate picture by the n-fold use of the inverse assignment algorithm as follows:

$$\begin{pmatrix} X_{R1} \\ Y_{R1} \\ 1 \end{pmatrix} = \frac{1}{d_7 X_n + d_8 Y_n + d_9} \begin{pmatrix} d_1 & d_2 & d_3 \\ d_4 & d_5 & d_6 \\ d_7 & d_8 & d_9 \end{pmatrix} \begin{pmatrix} X_n \\ Y_n \\ 1 \end{pmatrix}$$

where $$\begin{pmatrix} d_1 & d_2 & d_3 \\ d_4 & d_5 & d_6 \\ d_7 & d_8 & d_9 \end{pmatrix} = \begin{pmatrix} b_1 & b_2 & b_3 \\ b_4 & b_5 & b_6 \\ b_7 & b_8 & b_9 \end{pmatrix}^{-n}$$

DESCRIPTION OF A PREFERRED EMBODIMENT

FIG. 2 shows a device for determining and executing such as assignment algorithm. The assignment signals which correspond to the parameters a1 to a8 and which have been generated and transmitted, for example at the sensor, are applied to an arithmetic device 2 which calculates therefrom the values of the parameters b1 to b9 of the assignment algorithm for two successive intermediate pictures or the values of the parameters c1 to c9 and/or d1 to d9 of the resultant assignment. The formation of the powers of the root of the matrix of the supplied parameters of the assignment of two successive reference pictures can be calculated exactly; however, these roots can also be advantageously approximated by the following relation:

$$\begin{pmatrix} c_1 & c_2 & c_3 \\ c_4 & c_5 & c_6 \\ c_7 & c_8 & c_9 \end{pmatrix} = \frac{N-n}{N} \begin{pmatrix} \frac{N}{N-n} + (a_1 - 1) & a_2 & a_3 \\ a_4 & \frac{N}{N-n} + (a_5 - 1) & a_6 \\ a_7 & a_8 & \frac{N}{N-n} \end{pmatrix}$$

This is obtained when the with power is expressed in a Taylor series which is truncated after the first term.

Thus, via the lines 7 and 17 the arithmetic device 2 supplies two address calculators 6 and 16 with signals which represent the matrices resulting from the raising of the power of the fundamental assignment matrix, or the inverse thereof, in accordance with the distance in rank between the relevant intermediate picture and the corresponding reference picture. Furthermore, the address calculators 6 and 16 receive the coordinate values $X_n$, $Y_n$ of the relevant pixel of the intermediate picture to be generated as well as the rank number n thereof from a counter 12, via the connection 13, which is also connected to the arithmetic device 2. From a clock generator (not shown) the counter 12 receives, via the line 11, a clock signal corresponding to the pixel frequency and controls or synchronizes also the display device 22. For each coordinate $X_n$, $Y_n$ and for each rank number n the address calculators 6 and 16 calculate the coordinates $X_{R2}$, $Y_{R2}$ and $X_{R1}$, $Y_{R1}$ of the associated pixels of the corresponding reference pictures R2 and R1, respectively as follows:

$$X_{R2} = \frac{c_1 X_n + c_2 Y_n + c_3}{c_7 X_n + c_8 Y_n + c_9} = Z_{X(2)}/\text{denominator (2)}$$

$$X_{R1} = \frac{d_1 X_n + d_2 Y_n + d_3}{d_7 X_n + d_8 Y_n + d_9}$$

$$Y_{R2} = \frac{c_4 X_n + c_5 Y_n + c_6}{c_7 X_n + c_8 Y_n + c_9} = Z_{Y(2)}/\text{denominator (2)}$$

$$Y_{R1} = \frac{d_4 X_n + d_5 Y_n + d_6}{d_7 X_n + d_8 Y_n + d_9}$$

Therein, the parameters c1 to c9 and d1 to d9 are generated by raising the matrix of the fundamental assignment algorithm, for two successive intermediate pictures to the power indicated.

These coordinate values are then applied as addresses to picture memories 4 and 14 which contain the picture signals of two successive reference pictures. To this end, the picture memories 4 and 14 are alternately filled with the picture signals of each time one reference picture via the input 24 for the picture signals by the switch 10 which is controlled by the counter 12. The picture signals applied to the input 24 may be either directly the transmitted picture signals or, because the transmission of the reference picture signals is generally so slow that the transmission time for a reference picture is longer than the display time of a picture, they may originate from a picture buffer memory (not shown) which slowly stores the transmitted picture signals and quickly outputs these signals to the relevant picture memory after the last intermediate picture has been generated.

The picture signals read from the addressed positions in the picture memories 4 and 14, representing the brightness value of the same object points in the two reference pictures, are preferably combined in a weighted manner so that the resultant picture signal represents a brightness value which is situated between the brightness of the two associated pixels in the two picture memories, that is to say corresponding to the distance in time between the relevant intermediate picture and the reference picture in the picture memory 4 or 14, i.e. in accordance with its rank number n. To this end, the picture signals are applied from the picture memories 4 and 14 to a multiplier 8, 18, respectively, in which they are multiplied by weighting signals which are derived from the rank number n of the intermediate picture by the arithmetic device 2. The multiplied values are added in an adder 20 and, scaled if necessary, in as far as this has not been taken into account by the weighting signals supplied by the arithmetic device 2. The output 21 of the adder 20 supplies the picture signals of the intermediate picture which are applied to the display device 22.

The addresses for the picture memories 4 and 14 can be determined in the address calculators 6 and 16, respectively, by means of a circuit arrangement as shown in FIG. 3. This arrangement includes three similar blocks 30, 32 and 38 which have the same construction; therefore, only the construction of the block 30 is shown in detail. In order to determine the numerator value $Z_X$ for the X coordinate, this block solves the following equation:

$$Z_X = c1 X_n c2 Y_n + c3.$$

To this end, signals derived from the parameters c1 to c3 are applied, via the lines 41, 43 and 45, from the arithmetic device 2 of FIG. 2 while control clock signals are applied by the counter 12 via the inputs 51, 53 and 55.

At the beginning of every new intermediate picture a picture changing signal is applied via the line 51 in order to set the switch 46 to its upper position so that the value applied to the input 41 is applied to the upper input of the adder 42, the lower input thereof receiving the value zero from the output of the register 44 because this register was erased by the picture clock signal on the line 51. The value applied to the input 41 corresponds to the absolute coefficient c3, albeit possibly with a restriction as will be explained hereinafter. Therefore, this value is also present on the output of the adder 42 and hence also on the input of the register 44 and is stored in the register 44 in response to the next pixel clock signal on the line 55.

Subsequently, the picture changing signal on the line 51 disappears and the switch 46 is then controlled between the two lower positions, exclusively by the row clock signal on the line 53, until the next picture changing signal.

The first row clock signal directly after the picture changing signal keeps the switch 46 in the central position, with the result that the value of the coefficient c2 which is associated with the row coordinate $Y_n$ and which is present on the input 43 is applied to the upper input of the adder 42, albeit again with a possible restriction as will be explained hereinafter. This value is added to the value of the absolute coefficient c3 which is already present in the register 44 and on the lower input of the adder 42, the sum being applied to the register 44 in which it is written in reaction to the next pixel clock signal on the line 55.

Subsequently, the row clock signal on the line 53 disappears and the switch 46 is set to its lower position, so that the coefficient c1 which is present on the line 45 and which is associated with the column coordinate $X_n$ which corresponds to the pixels in the row is applied to the upper input of the adder 42. The assembly formed by the adder 42 and the register 44 thus represents an accumulator which, in reaction to each pixel clock signal on the line 55, accumulates the value of the coefficient c1 and the previously determined sum.

The next row clock signal on the line 53 sets the switch 46 to its central position again; thereafter, not only the coefficient c2 associated with the row coordinate Y must be added via the input 43, but the accumulation of the coefficient c1 associated with the column coordinate $X_n$ should also commence again. Therefore, via the input 43 there is applied the value (c2−kc1), where k is the number of pixels of a row, that is to say the number of times that the coefficient c1 was accumulated between two row clock signals. In order to avoid the necessity of applying another value to the input 43 in response to the first row clock signal after a picture changing signal, that is to say the coefficient c2 alone, the sum (c3+kc1) can be continuously applied to the input 41 and the difference (c2−kc1) continuously to the input 43.

Thus, successive numerator values $Z_X$ appear on the output 31 of the block 30 for successive pixels of each time one row of the intermediate picture. It is assumed that the values of the parameters c1 to c3 which are applied via the inputs 41, 43 and 45 are chosen so that the range of values of the numerator corresponds to the desired range of values; this can be achieved by means of a corresponding standardization of the parameter values and/or the reciprocal values generated by the device 40, as will be explained hereinafter.

Similarly, in block 32 the numerator value $Z_Y$ for the Y coordinate is derived from the signal which are applied via inputs 47 and which are derived from the parameters c4 to c6, while in block 38 the common denominator value is derived from the signals which are applied via inputs 49 and which are derived from the parameters c7 to c9. In order to avoid the technical execution of a division, the denominator value determined in the block 38 is applied to a device 40 which preferably is a read-only memory for forming a reciprocal value. The reciprocal value supplied on line 39 is applied to one input of two multipliers 34 and 36, multiplier 34 receiving the numerator value $Z_X$ via line 31 while multiplier 36 receives the denominator value $Z_Y$ via line 33. Via lines 35 and 37, multipliers 34 and 36 successively supply the values of the coordinates of pixels of the associated reference picture wherefrom the row-wise successive pixels of the intermediate picture are derived. These coordinate values can be converted into addresses for the associated memory; however, it is more efficient to store the pixels in the picture memory at addresses such that each address can be subdivided into two address sections, one address section indicating the one coordinate while the other address section indicates the other coordinate. In such a case, lines 35 and 37 together carry directly the address of the associated picture memory. In this respect corresponding ranges of the values generated by blocks 30, 32 and 38 are assumed. Otherwise the range of the values supplied by the multipliers 34 and 36 can be scaled by means of a constant scaling factor during the formation of the reciprocal value; in the described realization this can readily achieved by means of a read-only memory with corresponding stored values.

When the two individual reference pictures do not differ very much i.e. when they overlap to a high degree, the coordinates for the reference pictures determined by means of the device shown in FIG. 3 will be situated near the coordinates of the relevant intermediate picture. Then it may be advantageous to determine, instead of the absolute coordinates for the reference pictures, the difference between each time one coordinate of an intermediate picture and the associated pixel of a reference picture, because the number of positions of the values for the corresponding coordinates will then be smaller. This can be performed by means of the same device as shown in FIG. 3; the values of the parameters must then be chosen accordingly. It will merely be necessary to connect adders for the addition of the absolute intermediate picture address subsequent to the multipliers 34 and 36.

The address calculators 6 and 16 in FIG. 2 or the embodiment of such an address calculator as shown in FIG. 3 can determine, for each pixel of the intermediate picture, the coordinates of the associated pixel in the reference picture with an accuracy which is greater than one pixel-to-pixel spacing, so that the coordinates determined for a pixel may be readily situated between four discrete stored pixels of the reference picture. Instead of using the value of the nearest pixel, in such a case the brightness of the four pixels in the reference picture which neighbour the exact coordinate can be added so as to form a weighted mean value for the determination of the brightness of an intermediate point. The weighting factors then depend on the position of the exact coordinates relative to the four neighbouring pixels.

In order to realize such an interpolation, it is necessary, notably for reasons of time, that the brightness of the four neighbouring pixels of the reference picture can be simultaneously read from the picture memory. In order to enable such simultaneous reading, each of the picture memories 4 and 14 of FIG. 2 is divided into four sub-memories so that each sub-memory stores only every second pixel in the X and the Y coordinate direction, i.e. each sub-memory stores one of four neighbouring reference picture pixels in a square. FIG. 4 shows the configuration of the pixels in the sub-memories; for the individual pixels of the picture rows Z1 to Z5 and the columns S1 to S6 the sub-memory is indicated in which the relevant pixel is stored, the sub-memories being denoted by the reference numerals T1 to T4.

Figure 5:
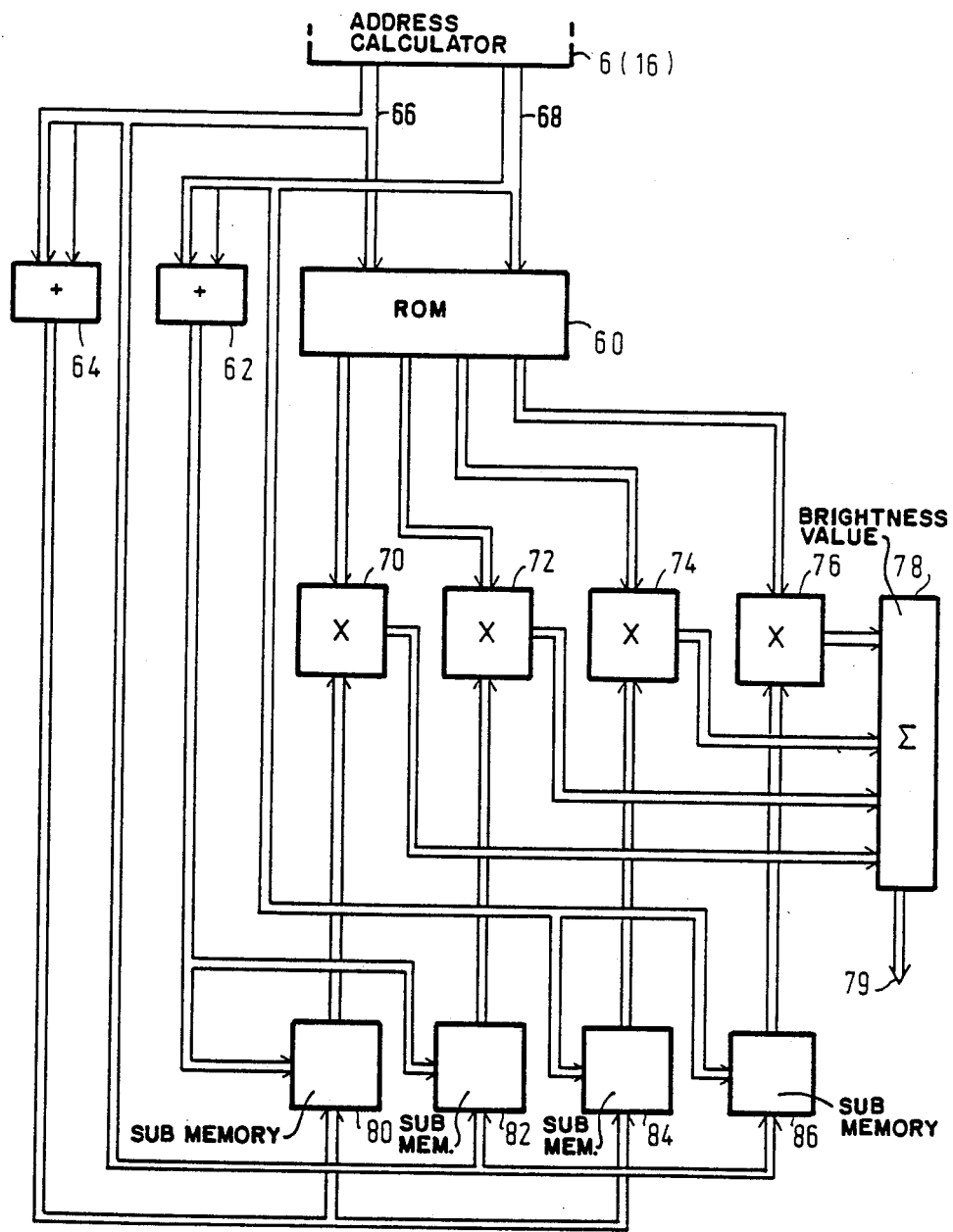
FIG. 5 shows a device for generating the picture signal of a pixel whose mathematical coordinates are situated between those of the actual pixels.

FIG. 5 shows a device for forming the weighted mean value of the brightness values of pixels. On the outputs 66 and 68 the address calculators 6 and 16, respectively, generate two multi-digit coordinate values as a number pair having the following form:

$$X_R = \ldots x2, x1, x0, x-1, \ldots x-m$$

$$Y_R = \ldots y2, y1, y0, y-1, \ldots y-m$$

where xi or yi represents a binary digit. The binary digit having an index $i<0$ indicate the positions behind the decimal point, i.e. the fractions of a pixel coordinate.

The addresses of the sub-memories 80, 82, 84 and 86 should be determined from these coordinate values; it must be taken into account that each sub-memory has half the number of addresses in each direction in comparison with the overall picture memory formed by the four sub-memories and storing the complete reference picture. Thus, the addresses of the sub-memories can be formed by dividing by 2 the coordinate values which appear on the outputs 66 and 68 and which are interpreted directly as addresses in the present case; the remainder should be taken into account to some extent as will be described with reference to FIG. 4. The picture signal value, i.e. the brightness of the point P1 which is situated between the rows Z1 and Z2 as well as between the columns S1 and S2 is formed from the first pixels of all four sub-memories T1 to T4. The point P2, however, which is situated between the same rows Z1 and Z2 but between the columns S2 and S3, is formed from the first pixels of the sub-memories T2 and T4 and the second pixels of the sub-memories T1 and T3. Thus, for the even sub-memories T2 and T4 the X address can be formed from the positions . . . x2, x1 before the decimal point of the X coordinate value appearing on the output 68 when only the last position x0 before the decimal point is omitted, while for the odd sub-memories T1 and T3 the value of the omitted position must still be added to the address thus formed. This takes place in an adder 64 in the device shown in FIG. 5. However, it is alternatively possible to add constantly the value "1" to all positions before the decimal point prior to the shift in the adder 64, and to omit the last position of the result which is output on the line 63, followed by a shift of one position to the right for all positions.

The same holds good for the Y coordinate, in which case the last position y0 before the decimal point can be directly omitted for the sub-memories T3 and T4; however, for the Y addresses for the sub-memories T1 and T2 this address must be corrected by means of the adder 62. The address control shown for the sub-memories 80, 82, 84 and 86 is thus realized.

The brightness values read from the sub-memories are applied to a respective multiplier 70, 72, 74 and 76 in which they are multiplied by the weights, the latter depending on the positions behind the decimal point of the coordinate values supplied via the outputs 66 and 68. These weights also depend on the last position before the decimal point, as appears from FIG. 4, when both points P1 and P2 are taken into account. Both points have identical positions behind the decimal point, but for the point P1 the corresponding point in the sub-memory T4 is nearest, while for the point P2 the corresponding point in the sub-memory T3 is nearest.

The formation of the weighting factors from the positions behind the decimal point and the last position before the decimal point of the coordinate values generated on the outputs 66 and 68 of the address calculators 6 and 16, respectively, is performed by a read-only memory 60. This memory supplies each of the multipliers 70, 72, 74 and 76 separately with a weighting factor and the weighted brightness values of the four pixels of the four sub-memories are summed in an adder 78 whose output 79 applies the resultant brightness value to the multipliers 8 and 18 of FIG. 2. It is alternatively possible to include the multipliers 8 and 18 in the multipliers 70, 72, 74 and 76 and to provide the read-only memory 60 with a control facility for the rank number n of the intermediate picture.

LIST OF FIGURE REFERENCE NUMERALS

FIG. 2: arithmetic device; 6, 16 address calculators, 12: counter; 22: display device; 4, 14: picture memories; 10: switch; 8, 18: multipliers; 20: adder;

FIG. 3: 30, 32, 38: address calculating blocks; 41, 43, 45: C1, C2, C3 inputs; 51, 53, 55: control inputs from counter; 46: switch; 42: adder; 44: register; 40: reciprocal value generator; 34, 36: multipliers; 35, 37: picture memory address lines;

FIG. 5: 6, 16: address calculators; 80, 82, 84, 86: sub-memories; 62, 64: adder; 70, 72, 74, 76: multiplier; 60: read-only memory; 78: adder; 79: brightness value output.

What is claimed is:

1. A method for generating a sequence of reference pictures and intermediate pictures derived from said reference pictures, comprising the steps of:
  (a) moving an optical sensor means relative to an object plane so that an optical axis of said sensor means has a directional component parallel to said object plane;
  (b) deriving at least first and second successive reference pictures of said object plane at a standard picture frequency using said sensor means;
  (c) in said first and second successive reference pictures, detecting a set of at least first and second reference pixels, each set of reference pixels representing an associated object plane position; and (d) interpolating between said first and second reference pictures a sequence of (N−1) intermediate pictures, so that a combined sequence of reference pictures and intermediate pictures has a frequency that is N times said standard frequency, where N is an integer greater than or equal to three, the step of interpolating including:
  (i) generating a multiplicative assignment so that N successive said multiplicative assignments map the reference pixels of the first reference picture on corresponding reference pixels of the second reference picture, and so that n successive multiplicative assignments, of the reference pixels of the first reference picture, map its reference pixels on corresponding reference pixels of an n-th intermediate picture, where n is an integer less than N; and
  (ii) determining positions of all pixels other than reference pixels in an intermediate picture from the positions of the reference pixels of the intermediate picture.

2. A method as claimed in claim 1 for a plurality of object planes, wherein for each object plane a separate assignment algorithm is formed from the assignment of corresponding pixels in a partial region containing the respective object.

3. The method of claim 1 comprising extrapolating intermediate pictures, at said frequency that is N times said standard frequency, from said second reference picture using said multiplicative assignment.

4. The method of claim 1 wherein said deriving step comprises generating signals representing said second reference picture as difference signals with respect to said first reference picture.

5. The method of claim 1 wherein said determining step comprises a further step of second interpolating a pixel of an intermediate picture from four neighboring pixels from one of the reference pictures using a weighted average of brightness values of the four neighboring pixels.

6. A method as claimed in claim 1, comprising the steps of:
  (a) generating the multiplicative assignment defined as follows:

$$\begin{pmatrix} X_{R2} \\ Y_{R2} \\ 1 \end{pmatrix} = \frac{1}{a_7 X_{R1} + a_8 Y_{R1} + 1} \begin{pmatrix} a_1 & a_2 & a_3 \\ a_4 & a_5 & a_6 \\ a_7 & a_8 & 1 \end{pmatrix} \begin{pmatrix} X_{R1} \\ Y_{R1} \\ 1 \end{pmatrix}$$

where $X_{R1}$, $Y_{R1}$ are coordinates of a pixel of the first reference picture, and $X_{R2}$, $Y_{R2}$ are coordinates of a corresponding pixel of the second reference picture and the values a1 to a8 of the matrix are determined at least from the two reference pictures, and (b) forming the multiplicative assignment for the intermediate pictures as:

$$\begin{pmatrix} X_{R2} \\ Y_{R2} \\ 1 \end{pmatrix} = \frac{1}{c_7 X_n + c_8 Y_n + c_9} \begin{pmatrix} c_1 & c_2 & c_3 \\ c_4 & c_5 & c_6 \\ c_7 & c_8 & c_9 \end{pmatrix} \begin{pmatrix} X_n \\ Y_n \\ 1 \end{pmatrix}$$

where $$\begin{pmatrix} c_1 & c_2 & c_3 \\ c_4 & c_5 & c_6 \\ c_7 & c_8 & c_9 \end{pmatrix} = \begin{pmatrix} b_1 & b_2 & b_3 \\ b_4 & b_5 & b_6 \\ b_7 & b_8 & b_9 \end{pmatrix}^{N-n}$$

where $X_n$, $Y_n$ are the coordinates of a corresponding pixel of the relevant intermediate picture and the values b1 to b9 are formed by:

$$\begin{pmatrix} b_1 & b_2 & b_3 \\ b_4 & b_5 & b_6 \\ b_7 & b_8 & b_9 \end{pmatrix} = \begin{pmatrix} a_1 & a_2 & a_3 \\ a_4 & a_5 & a_6 \\ a_7 & a_8 & 1 \end{pmatrix}^{1/N}.$$

7. A method as claimed in claim 6, wherein the generating step comprises the step of calculating the values c1 to c9 as:

$$\begin{pmatrix} c_1 & c_2 & c_3 \\ c_4 & c_5 & c_6 \\ c_7 & c_8 & c_9 \end{pmatrix} =$$

$$\frac{N-n}{N} \begin{pmatrix} \frac{N}{N-n} + (a_1 - 1) & a_2 & a_3 \\ a_4 & \frac{N}{N-n} + (a_5 - 1) & a_6 \\ a_7 & a_8 & \frac{N}{N-n} \end{pmatrix}.$$

8. The method of claim 1 comprising generating said multiplicative assignment so that N successive applications of the inverse of said multiplicative assignment maps the reference pixels of the second successive reference picture on the reference pixels of the first reference picture.

9. A method as claimed in claim 8 for a plurality of object planes, wherein for each object plane a separate assignment algorithm is formed from the assignment of corresponding pixels in a partial region containing the respective object.

10. A method as claimed in claim 1, wherein the signals indicating the assignment of corresponding pixels in neighbouring reference pictures are determined at the side of the sensor and are transmitted in addition to the reference picture signals.

11. A method as claimed in claim 10 for a plurality of object planes, wherein for each object plane a separate assignment algorithm is formed from the assignment of corresponding pixels in a partial region containing the respective object.

12. A method as claimed in claim 10, characterized in that the signals indicating the assignment are determined at the side of the sensor from the pictures generated at a higher picture frequency by the sensor.

13. A method as claimed in claim 12 for a plurality of object planes, wherein for each object plane a separate assignment algorithm is formed from the assignment of corresponding pixels in the partial region containing the respective object.

14. A device for generating a sequence of reference pictures and intermediate pictures derived from said reference pictures, comprising:

(a) sensor means having an optical axis and movable relative to an object plane so that the optical axis has a directional component parallel to said object plane, said sensor means providing at a standard frequency signals representing at least first and second successive reference pictures and providing signals representing a multiplicative assignment which maps first and second reference pixels of said first reference picture on corresponding first and second reference pixels of said second picture;

(b) at least one random access picture memory for storing the signals representing the reference pictures in a given address sequence;

(c) arithmetic means for determining, from the signals representing the multiplicative assignment, signals representing an intermediate multiplicative assignment, N said intermediate multiplicative assignment being equivalent to said multiplicative assignment, n successive intermediate multiplicative assignments mapping the first and second reference pixels of the first reference picture onto corresponding first and second reference pixels of an n-th intermediate picture, where N is an integer greater than or equal to three and n is an integer less than N;

(d) address calculating means for generating addresses from the signals representing the intermediate multiplicative assignment and from coordinates of pixels of intermediate pictures to be generated, said addresses being provided to address the picture memory; and (e) output means for providing, as intermediate picture signals, the reference picture signals read at said addresses, the sequence of intermediate picture signals and reference signals being provided at said output means at a frequency which is N times said standard frequency.

15. A device as claimed in claim 14 comprising:

(a) two random access picture memories (4, 14) for alternately storing the reference picture signals of one reference picture; and (b) two address calculating means (6, 16) one associated with each picture memory; and wherein:

(c) the arithmetic means (2) determines:
  (i) for each address calculating means the signals for the intermediate multiplicative assignment of the pixels, of the reference picture stored in the associated picture memory, to each pixel of the relevant intermediate picture;
  (ii) a weighting factor corresponding to the number n of the intermediate picture; and (d) the output means (8, 18, 20) includes:
  (i) for each picture memory a multiplier (8, 18) for multiplying the reference picture signals read from the associated picture memory by the weighting factor; and
  (ii) an adder (20) for adding the multiplied reference picture signals and for generating the intermediate picture signal.

16. A device as claimed in claim 14, wherein:

(a) each picture memory consists of four sub-memories (80 to 86), each of which stores the reference picture signal of a respective one of each time four neighbouring reference pixels in a square;

(b) each address calculating device (6, 62, 64) determines the addresses with an accuracy of fractions of integer units and addresses, in each sub-memory, the reference pixel which best approximates the exact address;

(c) picture signal outputs (81 to 87) of the sub-memories are followed by:
  (i) a multiplier device (70 to 76) for multiplying the picture signal of each sub-memory by a weighting factor which is derived from the last bit position before and the bit positions behind the decimal point of the exact address; and
  (ii) an adder device (78) for adding the multiplied picture signals and for generating the resultant reference picture signal for the output device.

17. The device of claim 14 wherein the intermediate multiplicative assignment is chosen so that N successive inverses of said intermediate multiplicative assignment map the reference pixels of the second successive reference picture on the reference pixels of the first reference picture.

18. The device of claim 17 wherein the inverse intermediate multiplicative assignment is $$\begin{array}{c} X_{R1} \\ Y_{R1} \\ 1 \end{array} = \frac{1}{d_7 X_n + d_8 Y_n + d_9} \begin{array}{ccc} d_1 & d_2 & d_3 \\ d_4 & d_5 & d_6 \\ d_7 & d_8 & d_9 \end{array} \begin{array}{c} X_n \\ Y_n \\ 1 \end{array}$$

where $X_{R1}$, $Y_{R1}$ are coordinates of a pixel in the first reference picture, and $X_n$, $Y_n$ are coordinates of a corresponding pixel in the nth intermediate picture, where $$\begin{array}{ccc} d_1 & d_2 & d_3 \\ d_4 & d_5 & d_6 \\ d_7 & d_8 & d_9 \end{array}^{-n} = \begin{array}{ccc} b_1 & b_2 & b_3 \\ b_4 & b_5 & b_6 \\ b_7 & b_8 & b_9 \end{array}$$

where $1/N$ $$\begin{array}{ccc} b_1 & b_2 & b_3 \\ b_4 & b_5 & b_6 \\ b_7 & b_8 & b_9 \end{array} = \begin{array}{ccc} a_1 & a_2 & a_3 \\ a_4 & a_5 & a_6 \\ a_7 & a_8 & 1 \end{array}$$

the multiplicative assignment being $$\begin{array}{c} X_{R2} \\ Y_{R2} \\ 1 \end{array} = \frac{1}{a_7 X_{R1} + a_8 Y_{R1} + 1} \begin{array}{ccc} a_1 & a_2 & a_3 \\ a_4 & a_5 & a_6 \\ a_7 & a_8 & 1 \end{array} \begin{array}{c} X_{R1} \\ Y_{R1} \\ 1 \end{array}$$

where $X_{R2}$, $Y_{R2}$ are coordinates of a corresponding pixel in the second reference picture.

19. The device of claim 18 wherein:

(a) the arithmetic means supplies the values $d_1$ to $d_9$;

(b) each address calculating means includes:
  (i) first, second and third sub-calculators (30, 32, 38) which respectively determine two numerator values, $Z_{x(2)} = d_1 X_n + d_2 Y_n + d_3$ and $Z_{y(2)} = d_4 X_n + d_5 Y_n + C_6$, for the addresses of the two coordinate directions and a denominator value, $d_7 X_n + d_8 Y_n + C_a$, from the values $d_1$ to $d_9$ supplied by the arithmetic device and from the coordinates of a present pixel of the intermediate picture;
  (ii) a reciprocal value forming device (40) which follows the third sub-calculator (38) for forming the reciprocal value of the denominator value,; and
  (iii) first and second multipliers (34, 36) which multiply the two numerator values by the reciprocal value, output signals of the two multipliers together representing the address of the reference picture pixel in the picture memory (4, 14).

20. The device of claim 19, wherein each subcalculator comprises an accumulator which comprises:
   (a) a switch, responsive to a picture changing signal at the beginning of each intermediate picture, and responsive to a row-changing signal at the beginning of each new row, for selectably supplying coefficients $d_1$ to $d_9$ or signals derived therefrom;
   (b) an adder having first and second inputs and producing an output signal, the first input being coupled to receive signals from the switch;
   (c) a register following the adder, having an output retrocoupled to the second input of the adder, and taking up the output of the adder in response to each pixel clock signal, the output of the register being further coupled to supply the relevant respective numerator or denominator value of the relevant subcalculator;
   the picture changing signals being applied to each switch so that the coefficients $d_3$, $d_6$, and $d_9$, or values derived therefrom, are reduced at the beginning of each new intermediate picture by $kd_1$, $kd_4$, and $kd_7$, respectively, where k is the number of pixels per row; and
   the row changing signals being applied to each switch so that the coefficients $d_2$, $d_5$, and $d_8$ are reduced at the beginning of each new row by $kd_1$, $kd_4$, and $kd_7$, respectively.

21. The device of claim 14
   (a) wherein the multiplicative assignment is $$\begin{pmatrix} X_{R2} \\ Y_{R2} \\ 1 \end{pmatrix} = \frac{1}{a_7 X_{R1} + a_8 Y_{R1} + 1} \begin{pmatrix} a_1 & a_2 & a_3 \\ a_4 & a_5 & a_6 \\ a_7 & a_8 & 1 \end{pmatrix} \begin{pmatrix} X_{R1} \\ Y_{R1} \\ 1 \end{pmatrix}$$

where $X_{R1}$, $Y_{R1}$ are coordinates of a pixel of the first reference picture, and $X_{R2}$, $Y_{R2}$ are coordinates of a corresponding pixel of the second reference picture and the values $a_1$ to $a_8$ of the matrix are determined at least from the two reference pictures, and
   (b) wherein the multiplicative assignment for the intermediate picture is formed by:

$$\begin{pmatrix} X_{R2} \\ Y_{R2} \\ 1 \end{pmatrix} = \frac{1}{c_7 X_n + c_8 Y_n + c_9} \begin{pmatrix} c_1 & c_2 & c_3 \\ c_4 & c_5 & c_6 \\ c_7 & c_8 & c_9 \end{pmatrix} \begin{pmatrix} X_n \\ Y_n \\ 1 \end{pmatrix}$$

where $$\begin{pmatrix} c_1 & c_2 & c_3 \\ c_4 & c_5 & c_6 \\ c_7 & c_8 & c_9 \end{pmatrix} = \begin{pmatrix} b_1 & b_2 & b_3 \\ b_4 & b_5 & b_6 \\ b_7 & b_8 & b_9 \end{pmatrix}^{N-n}$$

where $X_n$, $Y_n$ are the coordinates of the pixels of the relevant intermediate picture and the values $b_1$ to $b_9$ are formed by:

$$\begin{pmatrix} b_1 & b_2 & b_3 \\ b_4 & b_5 & b_6 \\ b_7 & b_8 & b_9 \end{pmatrix} = \begin{pmatrix} a_1 & a_2 & a_3 \\ a_4 & a_5 & a_6 \\ a_7 & a_8 & 1 \end{pmatrix}^{1/N}$$

22. A device as claimed in claim 21, wherein:
   (a) the arithmetic means supplies the values $c_1$ to $c_9$;
   (b) each address calculating means includes:
      (i) first, second and third sub-calculators (30, 32, 38) which respectively determine two numerator values, $Z_{x(2)} = c_1 X_n + c_2 Y_n + c_3$ and $Z_{y(2)} = c_4 X_n + c_5 Y_n + C_6$, for the addresses of the two coordinate directions and a denominator value, $c_7 X_n + c_8 Y_n + C_a$, from the values $c_1$ to $c_9$ supplied by the arithmetic device and from the coordinates of a present pixel of the intermediate picture;
      (ii) a reciprocal value forming device (40) which follows the third sub-calculator (38) for forming the reciprocal value of the denominator value,; and
      (iii) first and second multipliers (34, 36) which multiply the two numerator values by the reciprocal value, output signals of the two multipliers together representing the address of the reference picture pixel in the picture memory (4, 14).

23. The device of claim 22, wherein each subcalculator comprises an accumulator which comprises:
   (a) a switch, responsive to a picture changing signal at the beginning of each intermediate picture, and responsive to a row-changing signal at the beginning of each new row, for selectably supplying coefficients $c_1$ to $c_9$, or signals derived therefrom;
   (b) an adder having first and second inputs and producing an output signal, the first input being coupled to receive signals from the switch;
   (c) a register following the adder, having an output retrocoupled to the second input of the adder, and taking up the output of the adder in response to each pixel clock signal, the output of the register being further coupled to supply the relevant respective numerator or denominator value of the relevant subcalculator;
   the picture changing signals being applied to each switch so that the coefficients $c_3$, $c_6$, and $c_9$, or values derived therefrom, are reduced at the beginning of each new intermediate picture by $kc_1$, $kc_4$, and $kc_7$, respectively, where k is the number of pixels per row; and
   the row changing signals being applied to each switch so that the coefficients $c_2$, $c_5$, $c_8$ are reduced at the beginning of each new row by $kc_1$, $kc_4$, and $kc_7$, respectively.

24. The device of claim 21 wherein the values $c_1$ to $c_9$ are calculated as:

$$\begin{pmatrix} c_1 & c_2 & c_3 \\ c_4 & c_5 & c_6 \\ c_7 & c_8 & c_9 \end{pmatrix} =$$

$$\frac{N-n}{N} \begin{pmatrix} \frac{N}{N-n} + (a_1 - 1) & a_2 & a_3 \\ a_4 & \frac{N}{N-n} + (a_5 - 1) & a_6 \\ a_7 & a_8 & \frac{N}{N-n} \end{pmatrix}.$$

25. A device as claimed in claim 24, wherein:
   (a) the arithmetic means supplies the values $c_1$ to $c_9$;
   (b) each address calculating means includes:

(i) first, second and third sub-calculators (30, 32, 38) which respectively determine two numerator values, $Z_{x(2)}=c_1 X_n + c_2 Y_n + c_3$ and $Z_{y(2)}=c_4 X_n + c_5 Y_n + C_6$, for the addresses of the two coordinate directions and a denominator value, $c_7 X_n + c_8 Y_n + C_a$, from the values $c_1$ to $c_9$ supplied by the arithmetic device and from the coordinates of a present pixel of the intermediate picture;

(ii) a reciprocal value forming device (40) which follows the third sub-calculator (38) for forming the reciprocal value of the denominator value,; and (iii) first and second multipliers (34, 36) which multiply the two numerator values by the reciprocal value, output signals of the two multipliers together representing the address of the reference picture pixel in the picture memory (4, 14).

26. A method for generating a sequence of reference pictures and intermediate pictures derived from said reference pictures, comprising the steps of:

(a) moving an optical sensor means relative to an object plane so that an optical axis of said sensor means has a directional component parallel to said object plane;

(b) deriving at least first and second successive reference pictures of said object plane at a standard picture frequency using said sensor means;

(c) in said first and second successive reference pictures, detecting a set of at least first and second reference pixels, each set of reference pixels representing an associated object plane position; and (d) extrapolating after said second reference picture a sequence of (N−1) intermediate pictures, so that a combined sequence of said second reference picture and intermediate pictures has a frequency that is N times said standard frequency,, where N is an integer greater than or equal to three, the step of extrapolating including:

(i) generating a multiplicative assignment so that N successive said multiplicative assignments map the reference pixels of the first reference picture on corresponding reference pixels of the second reference picture, and so that n successive multiplicative assignments, of the reference pixels of the first reference picture, map its reference pixels on corresponding reference pixels of an n-th intermediate picture, where n is an integer less than N; and (ii) determining positions of all pixels other than reference pixels in an intermediate picture from the positions of the reference pixels of the intermediate picture.

27. A method as claimed in claim 26, comprising the steps of (a) generating the multiplicative assignment defined as follows:

$$\begin{pmatrix} X_{R2} \\ Y_{R2} \\ 1 \end{pmatrix} = \frac{1}{a_7 X_{R1} + a_8 Y_{R1} + 1} \begin{pmatrix} a_1 & a_2 & a_3 \\ a_4 & a_5 & a_6 \\ a_7 & a_8 & 1 \end{pmatrix} \begin{pmatrix} X_{R1} \\ Y_{R1} \\ 1 \end{pmatrix}$$

where $X_{R1}$, $Y_{R1}$ are coordinates of a pixel of the first reference picture, and $X_{R2}$, $Y_{R2}$ are coordinates of a corresponding pixel of the second reference picture and the values $a_1$ to $a_8$ of the matrix are determined at least from the two reference pictures, and (b) forming the multiplicative assignment for the intermediate pictures as:

$$\begin{pmatrix} X_{R2} \\ Y_{R2} \\ 1 \end{pmatrix} = \frac{1}{c_7 X_n + c_8 Y_n + c_9} \begin{pmatrix} c_1 & c_2 & c_3 \\ c_4 & c_5 & c_6 \\ c_7 & c_8 & c_9 \end{pmatrix} \begin{pmatrix} X_n \\ Y_n \\ 1 \end{pmatrix}$$

where $$\begin{pmatrix} c_1 & c_2 & c_3 \\ c_4 & c_5 & c_6 \\ c_7 & c_8 & c_9 \end{pmatrix} = \begin{pmatrix} b_1 & b_2 & b_3 \\ b_4 & b_5 & b_6 \\ b_7 & b_8 & b_9 \end{pmatrix}^{N-n}$$

where $X_n$, $Y_n$ are coordinates of a corresponding pixel of the relevant intermediate picture and the values $b_1$ to $b_9$ are formed by:

$$\begin{pmatrix} b_1 & b_2 & b_3 \\ b_4 & b_5 & b_6 \\ b_7 & b_8 & b_9 \end{pmatrix} = \begin{pmatrix} a_1 & a_2 & a_3 \\ a_4 & a_5 & a_6 \\ a_7 & a_8 & 1 \end{pmatrix}^{1/N} .$$

28. A method as claimed in claim 27, wherein the generating step comprises the step of calculating the values $c_1$ to $c_9$ as:

$$\begin{pmatrix} c_1 & c_2 & c_3 \\ c_4 & c_5 & c_6 \\ c_7 & c_8 & c_9 \end{pmatrix} =$$

$$\frac{N-n}{N} \begin{pmatrix} \frac{N}{N-n} + (a_1 - 1) & a_2 & a_3 \\ a_4 & \frac{N}{N-n} + (a_5 - 1) & a_6 \\ a_7 & a_8 & \frac{N}{N-n} \end{pmatrix} .$$

* * * * *